(12) United States Patent
Torrione (10) Patent No.: US 10,954,729 B2
(45) Date of Patent: Mar. 23, 2021

(54) SYSTEM AND METHOD FOR ESTIMATING CUTTING VOLUMES ON SHALE SHAKERS

(71) Applicant: HELMERICH & PAYNE TECHNOLOGIES, LLC, Tulsa, OK (US)

(72) Inventor: Peter A. Torrione, Durham, NC (US)

(73) Assignee: HELMERICH & PAYNE TECHNOLOGIES, LLC, Tulsa, OK (US)

( * ) Notice: Subject to any disclaimer, the term of this patent is extended or adjusted under 35 U.S.C. 154(b) by 484 days.

(21) Appl. No.: 15/251,940

(22) Filed: Aug. 30, 2016

(65) Prior Publication Data
US 2017/0058620 A1 Mar. 2, 2017

Related U.S. Application Data

(60) Provisional application No. 62/212,252, filed on Aug. 31, 2015.

(51) Int. Cl.
| | | |
|---|---|---|
| E21B 21/06 | (2006.01) | |
| E21B 21/08 | (2006.01) | |
| E21B 47/04 | (2012.01) | |

(52) U.S. Cl.
CPC ............ *E21B 21/065* (2013.01); *E21B 21/08* (2013.01); *E21B 47/04* (2013.01)

(58) Field of Classification Search
CPC ......... E21B 21/065; E21B 21/08; E21B 47/04
USPC ......................................................... 175/46
See application file for complete search history.

(56) References Cited

U.S. PATENT DOCUMENTS

| | | |
|---|---|---|
| 3,831,680 A | 8/1974 | Edwards et al. |
| 4,610,005 A | 9/1986 | Utasi |
| 4,658,903 A | 4/1987 | Tateishi |
| 4,914,591 A | 4/1990 | Warren et al. |
| 6,469,734 B1 | 10/2002 | Nichani et al. |
| 7,874,351 B2 | 1/2011 | Hampton et al. |
| 7,933,166 B2 | 4/2011 | Goodman |
| 8,210,283 B1 | 7/2012 | Benson et al. |
| 8,218,826 B2 | 7/2012 | Ciglenec et al. |
| 8,233,667 B2 | 7/2012 | Helgason et al. |
| 8,363,101 B2 | 1/2013 | Gschwendtner et al. |
| 8,395,661 B1 | 3/2013 | Olsson et al. |

(Continued)

FOREIGN PATENT DOCUMENTS

| | | |
|---|---|---|
| WO | 2016077521 A1 | 5/2016 |
| WO | 2016147045 A1 | 9/2016 |

(Continued)

OTHER PUBLICATIONS

International Search Report & Written Opinion (PCP/US2016/049704), dated Nov. 10, 2016.

(Continued)

*Primary Examiner* — Taras P Bemko
(74) *Attorney, Agent, or Firm* — Kilpatrick Townsend & Stockton LLP (57) ABSTRACT

A system for monitoring the volume of cuttings exiting a shaker table is disclosed. The system comprises a shaker table configured to be adjusted based on information compiled by a processor and at least one camera configured to monitor said shaker table. The camera may be operably connected to the processor. The processor may be configured to identify drill cuttings and estimate the volume of the cuttings exiting the shaker table using machine vision techniques.

15 Claims, 6 Drawing Sheets

(56) References Cited

U.S. PATENT DOCUMENTS

| | | |
|---|---|---|
| 8,547,428 B1 | 10/2013 | Olsson et al. |
| 8,622,128 B2 | 1/2014 | Hegeman |
| 8,812,236 B1 | 8/2014 | Freeman et al. |
| 8,873,806 B2 | 10/2014 | Kiest, Jr. |
| 9,041,794 B1 | 5/2015 | Olsson et al. |
| 9,134,255 B1 | 9/2015 | Olsson et al. |
| 9,279,319 B2 | 3/2016 | Savage |
| 9,410,877 B2 | 8/2016 | Maxey et al. |
| 9,464,492 B2 | 10/2016 | Austefjord et al. |
| 9,494,030 B2 | 11/2016 | Benson et al. |
| 9,518,817 B2 | 12/2016 | Baba et al. |
| 9,651,468 B2 | 5/2017 | Rowe et al. |
| 9,664,011 B2 | 5/2017 | Kruspe et al. |
| 9,677,882 B2 | 6/2017 | Kiest |
| 9,706,185 B2 | 7/2017 | Ellis |
| 9,869,145 B2 | 1/2018 | Jones et al. |
| 9,912,918 B2 | 3/2018 | Samuel |
| 9,915,112 B2 | 3/2018 | Geehan et al. |
| 10,227,859 B2 | 3/2019 | Richards et al. |
| 10,328,503 B2 | 6/2019 | Osawa et al. |
| 2006/0162962 A1 | 7/2006 | Koederitz et al. |
| 2007/0165225 A1 | 7/2007 | Trainer |
| 2009/0159294 A1 | 6/2009 | Abdollahi et al. |
| 2011/0093876 A1 | 4/2011 | Belz et al. |
| 2011/0220410 A1 | 9/2011 | Aldred et al. |
| 2012/0242822 A1 | 9/2012 | Rodney et al. |
| 2013/0236064 A1 | 9/2013 | Li et al. |
| 2013/0265409 A1 | 10/2013 | Tjhang et al. |
| 2013/0275100 A1 | 10/2013 | Ellis et al. |
| 2014/0002617 A1 | 1/2014 | Zhang et al. |
| 2014/0116776 A1 | 5/2014 | Marx et al. |
| 2014/0326505 A1 | 11/2014 | Davis et al. |
| 2014/0333754 A1 | 11/2014 | Graves et al. |
| 2015/0013448 A1 | 1/2015 | Smith |
| 2015/0075866 A1 | 3/2015 | Tjhang |
| 2015/0138337 A1 | 5/2015 | Tjhang et al. |
| 2015/0188984 A1 | 7/2015 | Mullins |
| 2015/0218936 A1 | 8/2015 | Maher et al. |
| 2015/0235544 A1 | 8/2015 | Hernandez et al. |
| 2016/0130889 A1 | 5/2016 | Torrione |
| 2016/0130917 A1 | 5/2016 | Torrione |
| 2016/0134843 A1 | 5/2016 | Torrione et al. |
| 2016/0292513 A1 | 10/2016 | Kozicz et al. |
| 2016/0305230 A1 | 10/2016 | Benson et al. |
| 2017/0089153 A1 | 3/2017 | Teodorescu |
| 2017/0138171 A1 | 5/2017 | Richards et al. |
| 2017/0145807 A1 | 5/2017 | Wendorf et al. |
| 2017/0161885 A1 | 6/2017 | Parmeshwar et al. |
| 2017/0167853 A1 | 6/2017 | Zheng et al. |
| 2017/0314369 A1 | 11/2017 | Rosano et al. |
| 2017/0322086 A1 | 11/2017 | Luharuka et al. |
| 2018/0180524 A1 | 6/2018 | Francois et al. |
| 2019/0024485 A1 | 1/2019 | Stromme et al. |
| 2019/0048707 A1 | 2/2019 | Benson et al. |
| 2019/0100988 A1 | 4/2019 | Ellis et al. |
| 2019/0102612 A1 | 4/2019 | Takemoto et al. |
| 2019/0136650 A1 | 5/2019 | Zheng et al. |
| 2019/0141294 A1 | 5/2019 | Thorn et al. |
| 2019/0206068 A1 | 7/2019 | Stark et al. |

FOREIGN PATENT DOCUMENTS

| | | |
|---|---|---|
| WO | 2017042677 A1 | 3/2017 |
| WO | 2017132297 A2 | 8/2017 |
| WO | 2017169225 A1 | 10/2017 |
| WO | 2017176689 A1 | 10/2017 |
| WO | 2017194078 A1 | 11/2017 |
| WO | 2017210033 A1 | 12/2017 |
| WO | 2018067122 A1 | 4/2018 |
| WO | 2018093273 A1 | 5/2018 |
| WO | 2018131485 A1 | 7/2018 |
| WO | 2018148832 A1 | 8/2018 |
| WO | 2018157513 A1 | 9/2018 |

OTHER PUBLICATIONS

U.S. Appl. No. 16/660,250, "Non-Final Office Action", dated Apr. 28, 2020, 20 pages.

U.S. Appl. No. 16/660,250, "Notice of Allowance", dated Nov. 20, 2020, 17 pages.

U.S. Appl. No. 16/660,250, "Notice of Allowance", dated Sep. 16, 2020, 17 pages.

Harold, et al., "Literature Survey and Background Studies Report (Task V)", RPSEA, Jul. 15, 2014, 90 pages.

PCT/US2019/057454, "International Search Report and Written Opinion", dated Jan. 13, 2020, 13 pages.

SYSTEM AND METHOD FOR ESTIMATING CUTTING VOLUMES ON SHALE SHAKERS

CROSS REFERENCE TO RELATED APPLICATIONS

This application claims the benefit of U.S. Provisional Application Ser. No. 62/212,252 filed Aug. 31, 2015. Applicant incorporates by reference herein Application Ser. No. 62/212,252 in its entirety.

FIELD OF THE INVENTION

The invention relates to systems and methods that use computer vision for measuring the volume of drilling cuttings exiting a shale shaker.

BACKGROUND AND SUMMARY

Modern drilling often involves scores of people and multiple inter-connecting activities. Obtaining real-time information about ongoing operations is of paramount importance for safe and/or efficient drilling. As a result, modern rigs often have thousands of sensors actively measuring numerous parameters related to operations, in addition to information about the down-hole drilling environment.

Despite the multitude of sensors on today's rigs, a significant portion of rig activities and sensing problems remain difficult to measure with classical instrumentation. Person-in-the-loop sensing is often utilized in place of automated sensing.

By applying automated, computer-based video interpretation, continuous, robust, and accurate assessment of many different phenomena may potentially be achieved without requiring a person-in-the-loop. Automated interpretation of video data is commonly known as computer vision. Recent advances in computer vision technologies have led to significantly improved performance across a wide range of video-based sensing tasks. Computer vision may be used in some cases to improve safety, reduce costs and/or improve efficiency.

As drilling fluid is pumped into the wellbore and back up, it typically carries with it solid material known as drilling cuttings. These cuttings are typically separated from the drilling fluid on an instrument known as a shale shaker or shaker table. The process of separating the cuttings from the fluid may be difficult to monitor using classical instrumentation due to the violent nature of the shaking process. Currently the volume of cuttings is difficult to measure and typically requires man-power to monitor. Knowledge of the total volume and/or approximate volume of the cuttings coming off the shaker table may improve the efficiency, safety, and/or environmental impact of the drilling process.

The configuration of the shale shaker may be optimized based on the location of the fluid front, the size and/or characteristics of drill cuttings, the characteristics of the shale shaker screen being used, and/or other parameters. Adjusting the angle of the shale shaker, relative to level, may help maximize the efficiency and lifespan of the shale shaker and shaker screens. If a shaker table is at too steep of a level, the portion of the screens closest to the deposit of drilling fluid may become damaged more quickly by drill cuttings while the further removed portions of the screen are never utilized. A steep shaker angle may also lead to inefficient separation of the cuttings and the drilling fluid, thus complicating the gathering of information relating to the drill cuttings. If the angle of the shaker is too low, drilling fluid may simply run off the end of the shaker table, leading to lost drilling fluid and potential environmental contamination. The vibration speed of the shaker table may similarly be optimized in order to maximize the efficiency and the useful lifespan of a shaker table and shaker table screens.

There is therefore a need for an automated computer vision based technique for estimating the volume of cuttings coming off of a shale shaker. Information from this system may be used to provide real-time information about the well-bore to the drill team. This information may also be used to optimize, improve, or adjust the shale shaker angle (saving mud, and/or increasing efficiency); alert an operator to expected and/or unexpected changes in the cuttings volumes which may, in some cases, be indicative of hole cleaning, influx, losses, and/or other problems; and show whether or not the volume of cuttings exiting the shaker is approximately commensurate with the rate of penetration ("ROP").

DETAILED DESCRIPTION

The shale shaker video monitor (SSVM) system may consist of a shale shaker table 105, shaker table screen 125, at least one and preferably more than one camera or other imaging device 110 configured to include a view of the shaker table 105, and a processor 115 configured to visually identify drill cuttings 101 as they approach and/or fall off the edge of the table 105. In a preferred embodiment, two or more cameras 110 with known locations may be used in order to provide substantially stereo vision. Alternatively, RGB-D cameras, ranging cameras, and/or other distance sensing equipment 130, such as LIDAR, may be used. Depending on the speed of the shaker 105 and/or the rate at which the cuttings 101 are moving, the camera(s) 110 may collect frames at rates between 0.003 Hz (1 frame per 5 minutes) and 30 Hz. In some embodiments, the camera(s) 110 may collect frames at rates as low as 0.017 Hz (1 frame per minute), 0.03 Hz (1 frame per 30 seconds), or 0.1 Hz (1 framer per 10 seconds). In some embodiments, the camera(s) 110 may collect frames at rates as fast as 2 Hz, 5 Hz, 10 Hz, or 20 Hz.

Each camera 110 may contain, or may be connected to, a processor 115 which is configured to perform detection and/or localization of the drilling cuttings 101 on the shaker 105. The processor 115 may additionally or alternatively be configured to identify cuttings 101, track the cuttings 101, and/or estimate the volume and/or shape of the cuttings 101. These actions may also be performed on a per unit time basis when desirable by analyzing the data sent from the camera 110 to the processor 115. It will be appreciated that the data from the camera 110 may be analyzed in order to create new data which may itself be analyzed in a vast number of ways. In some embodiments, information from the camera(s) 110 may be combined with information from multiple sensors. Information related to the flow-in, drilling pumps, flow-out, and/or pit volume, collectively known as the circulation system, may be useful in combination with some embodiments. By combining this information, the system may be able to provide different information and/or alerts under different conditions, such as when the pumps are on vs. off. Information across the different sensor modalities may be fused to allow the system to make better decisions under certain circumstances.

Disclosed embodiments include many possible combinations of cameras 110 and sensors. For example, optical or video cameras, single or multi-stereo-cameras, IR, LIDAR, RGB-D cameras, or other recording and/or distance-sensing equipment may all be used, either alone or in combination. Each camera or combination of cameras and sensors may be used to track the volume of cuttings 101 exiting a shaker table 105. Information from the cameras 110 and/or sensors may be combined with information from the circulation system (e.g., flow-in, flow-out, and pit-volume) to modify the system's behavior as desired.

Information about the absolute and/or relative change in cutting 101 volumes coming off of the shaker table 105 may, under certain conditions, be combined with circulation system parameters and/or other drilling parameters, such as rate of penetration, and be relayed to the drilling engineer or other personnel. For example, a sudden change, either decrease or increase, in the cuttings volume not correlated to changing rate of penetration may indicate hole cleaning problems, influxes, and/or other changes in conditions. Additionally, a sudden change in the spatial characteristics of the cuttings 101 may indicate a cave-in or other phenomena.

The shale shaker or shaker table 105 may be any model, type, or design of shale shaker used in the industry. Additionally, custom designed shakers or shaker tables build for a specific application are also considered. One purpose of a shaker table is to separate drill cuttings from the drilling mud. Drilling mud is commonly used to cool and lubricate drilling components as well as transport the drill cuttings up to the surface from the bottom of the well bore. As is known in the industry, a wide variety of designs and components may be used to serve this purpose.

Disclosed embodiments allow the angle and speed of the shaker table 105 to be adjusted in response to information compiled by the processor 115. Traditionally, a human would be required to monitor the shale shaker periodically. There could be hours in between each individual observation performed by the human operator. The angle of some traditional shaker tables could be manually adjusted if the human operator determined that angle adjustment was necessary. Disclosed embodiments allow for observation of the shaker table 105 as often as every 5 minutes, 1 minute, 30 seconds, 10 seconds, 1 second, or substantially continuous monitoring. Disclosed embodiments also allow for adjustment of the angle and/or speed of the shale shaker 105 every 1 hour, 10 minutes, 5 minutes, 1 minute, 30 seconds, 10 seconds, 1 second, or substantially continuous adjustment of the shale shaker angle. This allows for maximizing the efficient use of the shaker table 105. This also prevents potentially devastating environmental impacts that can be caused when drilling fluid is allowed to run off the shaker table 105 due to inadequate adjustment of the angle and/or speed of the table 105 in response to changing conditions. Utilizing more frequent or nearly continuous monitoring and adjustment of shaker table angle and/or speed helps to prevent ecological damage and maintain the life of the shaker screens 125. Additionally, frequent monitoring and adjustment of the speed of the shaker table 105 may help to reclaim a higher percentage of the drilling fluid used in the well circulation system 200. By maintaining an ideal shaker speed, significant cost savings can be realized while minimizing the potential damage caused to the screen 125 by the drill cuttings 101. Disclosed embodiments may adjust the speed of the shaker table 105 through electronic, mechanical, or other appropriate controls of the motors responsible for vibrating the shale shaker. The angle of the shaker 105 may be adjusted using hydraulic, pneumatic, mechanical, or other known means for adjusting the angle of a shale shaker 105.

Shaker screens 125 are typically cleaned using pressurized water although a variety of known methods may be used. The screen 125 may be cleaned manually or, preferably, using an automated system. When the screen 125 is clean, disclosed embodiments will be most able to determine the overall damage of the shale shaker screen 125. Automated screen cleaning systems may involve at least one or a plurality of pressurized spray nozzles which spray water or another liquid at the screen 125 in order to clean it. Other automated screen cleaning systems may utilize brushes or pressurized air in order to clean the system. The nozzles used may be stationary or may be moved using an automated mounting system. If a plurality of nozzles are used, the automated system may be able to more adequately clean the entire screen without utilizing movable spray nozzles. If a single nozzle is used, it will likely need to be movable in order to adequately clean the entire surface of the screen. In some embodiments, only a portion of the screen will need to be cleaned in order to realize significant benefit from the automated screen cleaning system.

Cameras (optical, IR, RGB-D, single, stereo, or multi-stereo among others) 110 may be mounted in any configuration around the shaker table 105. In many embodiments, the cameras 110 will be mounted within pre-defined constraints around the shaker table 105. In one embodiment, camera 110 orientations are approximately 45 degrees to the shaker table 105, but cameras 110 may be placed anywhere with a view of the cuttings 101 and/or the fluid front. This may include from 0 degrees to 180 degrees pitch. When using a single camera 110, it may be preferable to place the camera 110 within a range of 60 degrees to −60 degrees of vertical. The camera 110 may be configured to capture a view from above, oriented approximately down at the top of the shaker 105.

In some embodiments, multiple cameras 110 may be placed in mutually beneficial locations. As an example, stereo vision approaches may improve particle size estimation. Stereo cameras 110 typically view the same scene from approximately the same angle but from different spatial locations. Alternatively, cameras 110 viewing the same scene from different angles, such as a front view, side angle view, and/or overhead view may provide different views of the same objects and may reduce the need for assumptions, such as rotational symmetry, in volume estimation. Additionally, when using multiple cameras 110, the preferred placement may depend on the shape, size, design, speed, and/or model of the shaker 105, the desired volume fidelity, and/or the configuration of sensors under consideration.

Preferably, multiple camera 110 placements may be configured to provide additional information from each camera or sensor as discussed.

Cameras 110 may be equipped with a flash or other light source 120 to maintain substantially adequate illumination across multiple images. This may be useful since the ambient lighting can change significantly depending on the time of day or night and/or the weather conditions. By maintaining adequate lighting, some processing complications may be able to be avoided. In some embodiments, light sources 120 which are independent of the cameras 110 may be used in order to provide suitable illumination.

Different behaviors of the cuttings 101 and shakers 105 may be expected during active-flow periods when the mud pumps are running and passive periods when the mud pumps are off. Additional changes may manifest during the transient periods shortly after the pumps switch either on or off. Additional data about the drilling process, such as hook load, bit depth, or rate of penetration, among others, may also be used to provide contextual information to the computer vision system in certain conditions.

In some embodiments, discrete cuttings 101 may be identified on the shaker 105, and/or as they fall off the end of the shaker 105 using one or more of many image processing features and/or machine vision techniques. Background subtraction and/or change detection may be used to identify cuttings 101 in part because cuttings 101 may appear different than the typical background, which may consist of a shale shaker 105, shale shaker screen 125, and/or other background features. Cuttings 101 may also appear different from the typical background when falling off the edge of the shaker 105. Cuttings 101 may additionally appear to "move" at an approximately constant velocity across a shaker table 105. These features may enable background estimation and/or subtraction techniques to be used to identify individual cuttings 101. Texture features may also be used for detection of drilling cuttings 101. Cuttings 101 may have an image texture which is different from the background. This may allow the cuttings 101 to be detected using this difference in texture. This detection may be accomplished using one-class classifiers to distinguish cuttings 101 as differences from the background and/or vice-versa. Two-class classifiers may also be used to actively distinguish two classes, one class for cuttings 101 and another for background. It will be appreciated that multiple-class classifiers may also be used when desirable.

In other embodiments, reflectivity and/or color properties may also be used for cutting detection. Cuttings 101 may often be covered in drilling fluid and therefore may have different reflectivity and/or coloration than the background (shale shaker, conveyor belt, and/or other background features). Cuttings 101 may therefore be detectable using these changes in color and reflectivity. It will be noted that these techniques may also be applicable when the cuttings 101 are not covered in drilling fluid, as long as the cuttings 101 do not present the same reflectivity and color characteristics as the background.

Other possible techniques for cuttings detection include, but are not limited to, histogram of oriented gradients ("HOG"), scale invariant feature transform ("SIFT"), speeded-up-robust-features ("SURF"), binary robust independent elementary features ("BRIEF"), Viola-Jones, ("V-J"), Haar wavelet, texture features (e.g., [Haralick 1973]), pre-trained deep convolutional neural networks (e.g., OverFeat [Sermanet, 2014]), or convolutional neural networks specifically trained on mud-shaker images or other reasonable image surrogates, and others. Suitable techniques are described in, for example, Pierre Sermanet, David Eigen, Xiang Zhang, Michael Mathieu, Rob Fergus, Yann LeCun: "OverFeat: Integrated Recognition, Localization and Detection using Convolutional Networks", International Conference on Learning Representations (ICLR 2014), April 2014, (OpenReview.net), (arXiv:1312.6229) Robert M. Haralick, K. Shanmugam, and Its'hak Dinstein, "Textural Features for Image Classification", IEEE Transactions on Systems, Man, and Cybernetics, 1973, SMC-3 (6): 610-621 which references are incorporated by reference herein.

Alternative embodiments may additionally and/or alternatively use persistence and/or tracking techniques to identify cuttings 101. Cuttings 101 often maintain approximately constant shape and size as they travel across the shaker 105. As a result, individual cuttings 101 may be able to be tracked and/or disambiguated across multiple frames. Tracking cuttings 101 may be accomplished using any of a number of tracking techniques, (e.g., Kalman filters, particle filters, and/or other ad-hoc tracking techniques). This may enable resolution of the cuttings 101 as multiple "looks" are aggregated on each cutting 101. In some embodiments, this may enable more accurate volume estimation as well.

Still more embodiments may use fluid and/or cuttings velocity estimation to identify cuttings 101. Cuttings 101 often move across the shaker screen 125 at approximately the same velocity as one another. This velocity may be estimated across all of the observed cuttings 101 and/or tracked (e.g., with a Kalman filter). This information may then be used to identify other cuttings 101 and/or predict the eventual locations of cuttings 101 that may be temporarily lost during the tracking and identification stage. Changes in this velocity may also be flagged to an operator.

In embodiments that comprise multiple cameras, LIDAR, and/or RGB-D cameras 110, particles may be identified using the observed "height" of the cuttings 101 as compared to the expected background height.

Techniques similar to those discussed may also be applicable in hyperspectral, IR, or other imaging modalities. As cuttings 101 are tracked on the shaker 105, conveyor belt, and/or other device, their volume can be estimated in several ways. In embodiments using single-sensor RGB cameras 110 or similar devices, the approximate volume of cuttings 101 may be estimated from a single viewpoint using rotationally symmetric assumptions about the cuttings 101, and the known, calculated, and/or estimated camera-to-shaker table distance. Alternatively, a cutting shape inference may be made using knowledge of the available light source 120 and estimating the reflectivity as a function of space on the visible parts of the cutting 101.

For embodiments using single-sensor RGB cameras 110 or similar devices, the approximate volume of the cuttings 101 may also be estimated using previously trained regression techniques which determine the approximate object volume using image region features (e.g., eccentricity, perimeter length, and area among others) extracted from individual cuttings in the image. These image region features may be used to identify changes in the cutting 101 shapes as well.

Embodiments which use multiple cameras 110, combined camera (e.g., stereo-camera) scenarios, or distance detection sensors 130, depth-information may be directly available and/or inferable. This may provide the visible cross-section of the object and/or a measure of how that cross-section varies with height. This information may be used to improve the volume estimation by reducing the symmetry assumptions required to estimate the volume of each cutting 101.

In some embodiments, the total volume of all the cuttings 101 visible in a scene, image, and/or frame may be estimated by combining information from the detection, tracking, and/or volume estimation portions of the techniques discussed. In other embodiments, the net volume flow may be calculated by considering the amount of volume entering or exiting the visible region per unit time. Alternatively, the change in volume may be estimated by calculating the volume of particles passing by a specified "line" in real-world space (e.g., the end of the shaker), or through a specified region on the shaker 105 or in the background. Depending on the particular installation, camera availability, and/or configuration, the total volume estimation may be appropriate for actual volume estimation in real-world units (e.g., 1M3 of cuttings per 5 minutes), and/or in relative terms (e.g., a 5% increase in cuttings volume in the last 5 minutes). Both may be valuable metrics in certain circumstances, but real-world units are preferable as the percent change can be derived from this information.

In still more alternative embodiments, information from the camera(s) 110 may be combined with information from the circulation system (e.g., flow-in, flow-out, ROP, and/or pit-volume) or other rig sensors to change the detection system behavior. As discussed, information across the different sensor modalities may be fused to make better decisions. As drilling continues, the camera system may be able to auto-calibrate to determine what a realistic amount of cuttings 101 per meter drilled is (e.g., leveraging ROP), and may additionally use this for automatic alarming if the observed volume of cuttings differs or diverges significantly.

Information regarding sudden unexpected changes in the volume, shapes, velocities, and/or other characteristics of the cuttings 101 can be brought to the users attention visually, audibly, or with other notifications. These notifications may be complete with photographs of the current situation and/or a plain-text description of the cause of the alarm (e.g., "sudden increase in volume of cuttings").

In other embodiments, the video data and/or other data may also be tagged along with any information extracted during the computer vision processing process. Gathered information may be displayed to an operator with a user interface which may include an annotated image of the shaker tables 105 under consideration. This image may be automatically annotated and may also, in certain embodiments, display marks identifying a variety of key features, such as the fluid front, cuttings 101, any potential issues, etc.

In another embodiment, the volume of cuttings 101 coming off the shaker table 105 may be estimated using a two-step process of object detection followed by volume estimation. Object detection may be accomplished by background subtraction, motion detection, direct object detection, and/or a variety of similar techniques. The use of RGB and IR cameras 110 may be useful under certain circumstances. Object detection may also be obtained using standard background depth estimation and/or subtraction approaches. The use of distancing equipment 130, such as LIDAR and/or RGB-D cameras, may have advantages with regard to these techniques.

Once a cutting 101 has been detected, a camera 110 may be used to estimate cutting volumes using the known camera transform parameters, the known distance to the shaker 105, and/or the shape and/or size of the detected object as it appears in the camera frame. Similar processing is applicable for many types of cameras 110, such as RGB, and IR cameras. For multiple cameras viewing the same scene, stereo vision techniques may be used to obtain a potentially more detailed 3-D representation of the cuttings 101, and thereby achieve more accurate volume estimations. If RGB-D or LIDAR data is available, these may be used to render 3-D models of the cuttings, for higher fidelity volume estimation.

Figure 4:
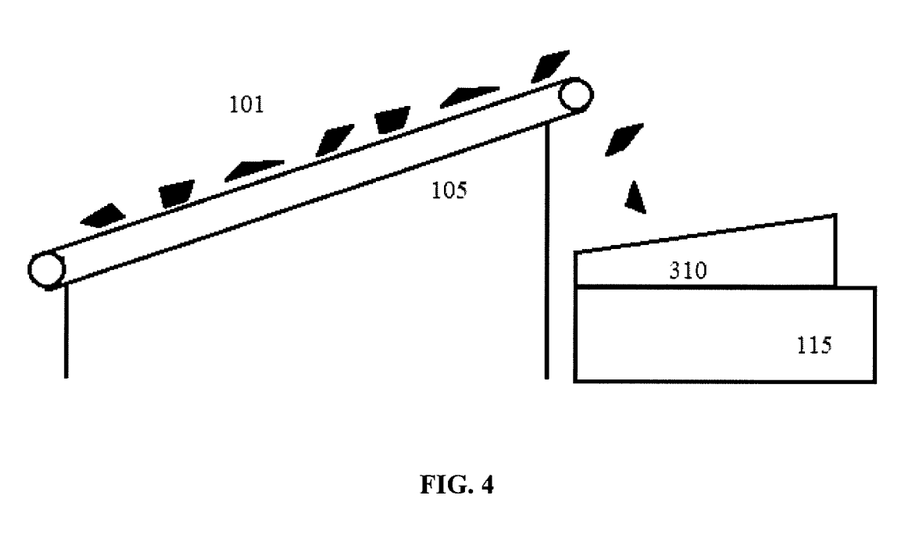
FIG. 4 depicts an alternate embodiment comprising a scale and processor in order to analyze cuttings on a shaker table.

In alternate embodiments of the system, a scale may 310 be used to determine the mass of cuttings 110 exiting a shale shaker 105. By monitoring the rate which a mass of cuttings 101 exit the shaker 105, changes in the well bore conditions may be extracted as discussed above. The weighing surface of the scale 310 may be adjustable. By angling the weighing surface, the speed at which cuttings and/or other material slide off the scale 310 after exiting the shale shaker 105 can be adjusted. This adjustment may be made for calibration reasons, in response to gathered data, in response to changing conditions, and/or for any other reason. In addition to monitoring the rate at which a given mass of cuttings 101 leaves the shale shaker 105, the scale 310 may be used to monitor the relative momentum, and/or mass, of individual drill cuttings 101. A pre-determined threshold may be set to notify the operator if there are any changes in the drill cuttings characteristics, such as average mass per unit time, average mass on the scale for a given set of known scale characteristics, and/or average standard deviations in the scale data. Scale characteristics that may impact these data sets could include the dimensions and shape of the weighing surface, the angle of the weighing surface, the relative locations of the scale 310 and the shale shaker 105, the physical properties of the weighing surface, etc. In some embodiments the weighing surface may itself be a screen to allow liquids to pass through and/or allow for easier cleaning.

Various control mechanisms may be appropriate to automate the angle and/or position of the shale shaker 105. For example, PID controllers and/or other systems may be used to adjust the shaker 105 based on acquired data. These adjustments may be done automatically, via a closed-loop system, or by instructing an operator to make the necessary changes based on the acquired data.

Figure 1:
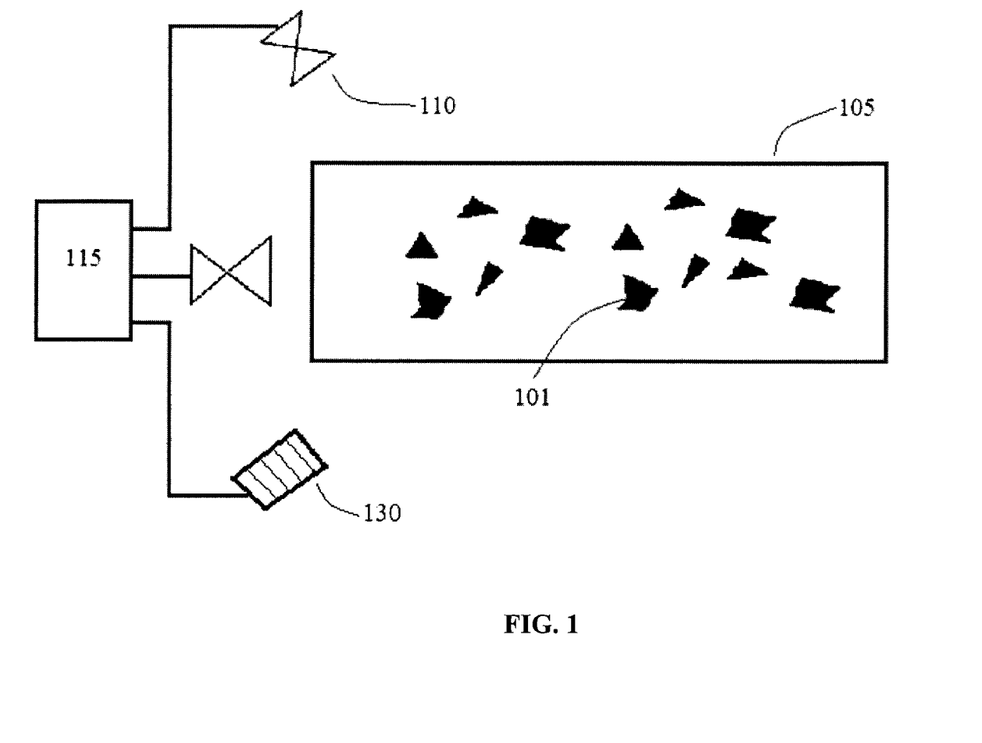
FIG. 1 depicts one of many disclosed embodiments of a system comprising multiple cameras and distance sensing equipment arranged to view drill cuttings on a shaker table.

FIG. 1 shows a potential embodiment of the system disclosed. This embodiment comprises two cameras 110 arranged to capture significantly different views of the cutting 101 on the shaker table 105. This embodiment also utilizes distance sensing equipment 130. The cameras 110 and the distance sensing equipment 130 are connected to the processor 115 such that the captured data may be sent to the processor 115 and analyzed.

Figure 2:
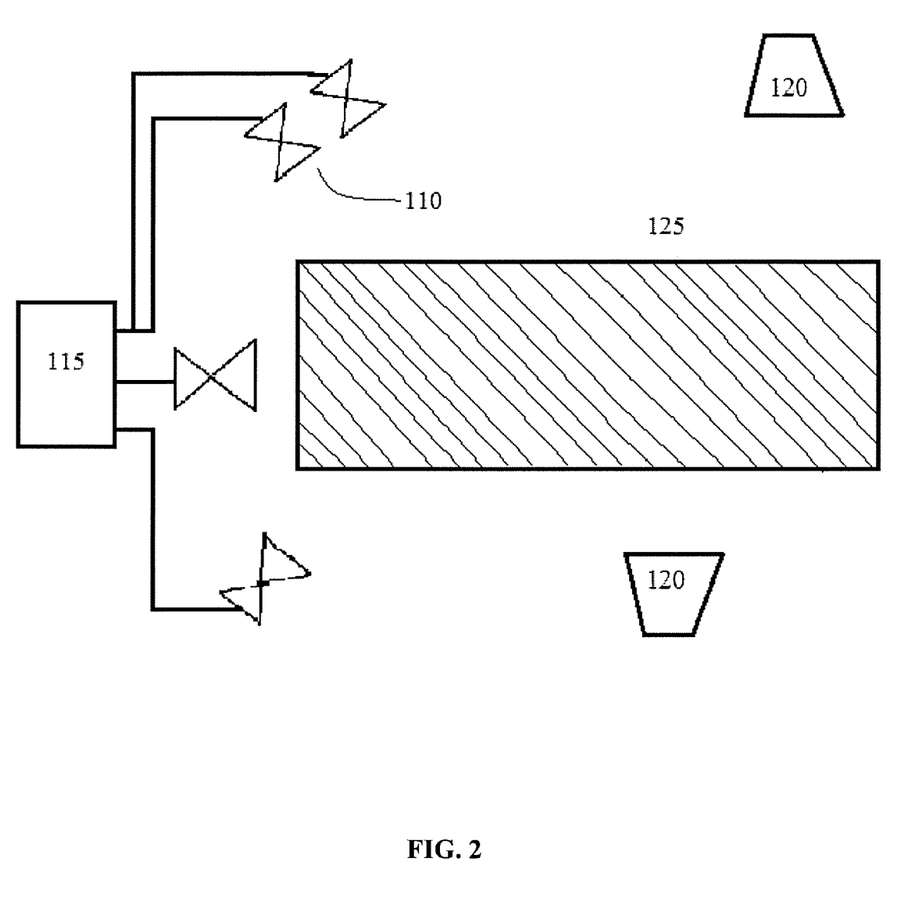
FIG. 2 depicts one of many disclosed embodiments of a system comprising multiple cameras and connected to a processor as well as multiple light sources arranged to illuminate a shaker table.

FIG. 2 shows a separate embodiment. This figure highlights the shaker table screen 125 and potential use of light sources 120 to illuminate the shaker table 105 during diverse times of day and weather. This figure also shows a possible stereo vision arrangement of cameras 110 which may be useful for obtaining additional visual data for processing.

Figure 3:
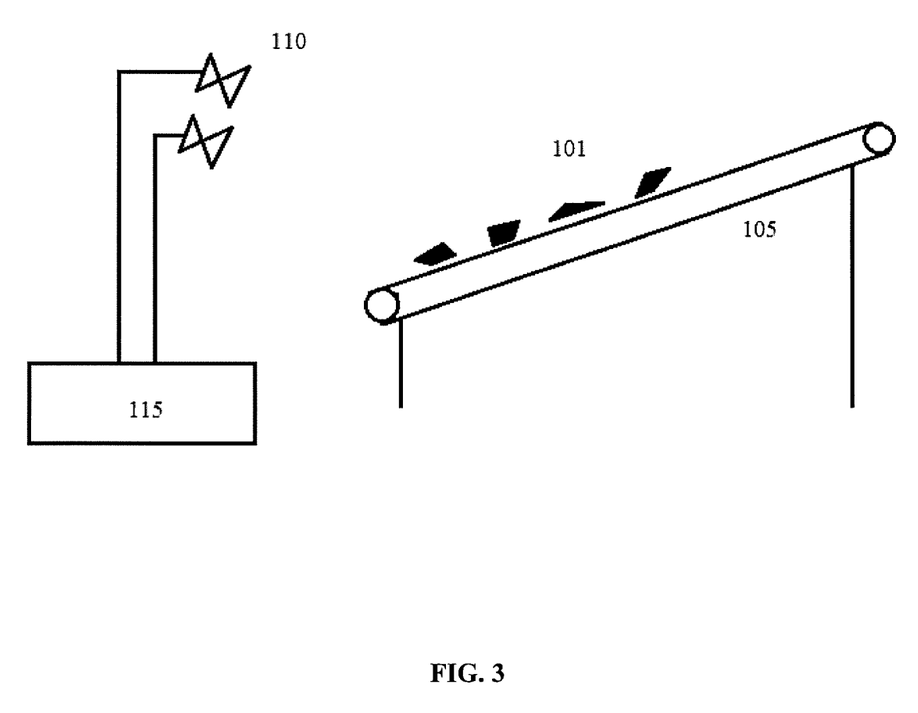
FIG. 3 depicts a side view of one disclosed embodiment.

FIG. 3 shows a side angle of a disclosed embodiment. The specific position of the cameras 110, distant sensors 130, and the like in relation to the shaker table in FIGS. 1, 2, and 3 may vary depending upon many factors such as number of shaker decks and the desired application. For example, in FIGS. 1 and 2 the cameras may be placed anywhere along the shaker table or even at the opposing end of the shaker table where the drier portion of the shaker is located in many instances. This may be particularly advantageous for multi-deck shakers.

FIG. 4 shows a side angle of an alternative embodiment comprising a scale 310 connected to a processor 115 in order to analyze drill cutting 101.

Figure 5:
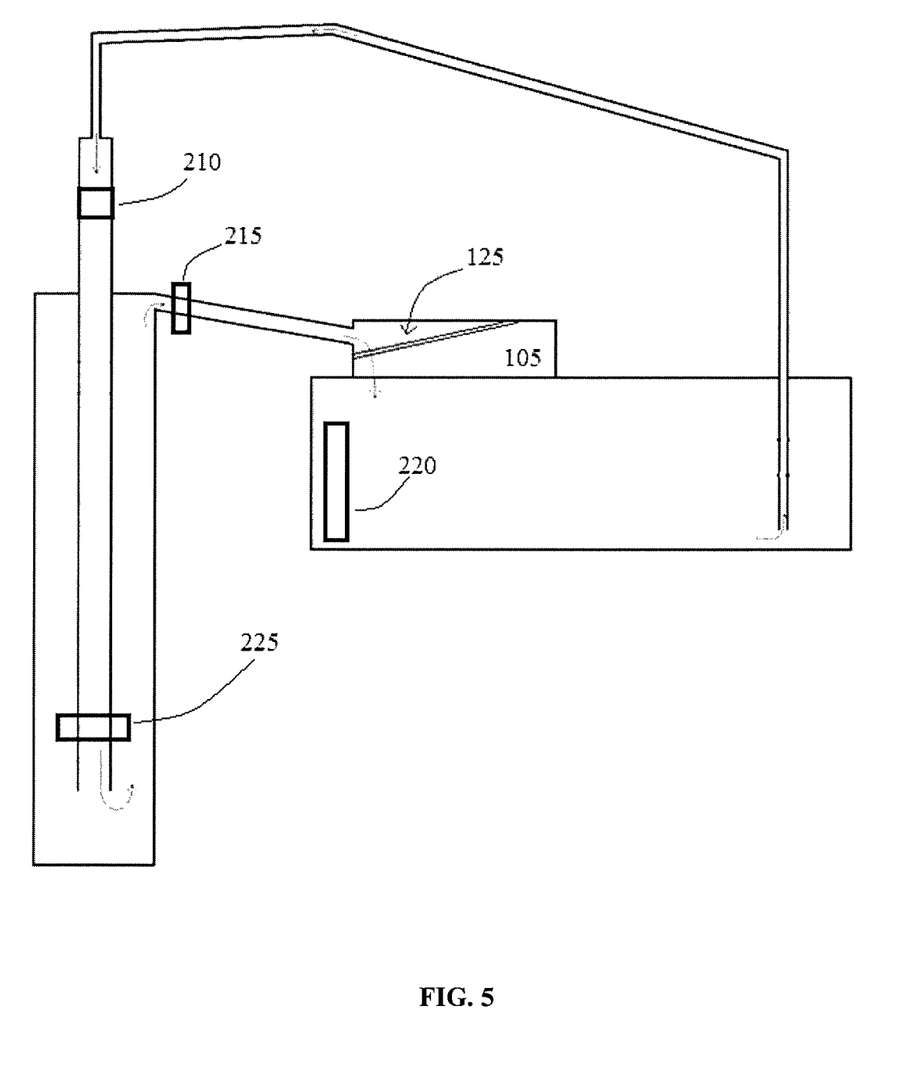
FIG. 5 depicts a typical well circulation system.

FIG. 5 shows a typical well circulation system in which drilling mud or another liquid may be pumped from a mud pit into a well bore. The mud is used to cool the drilling equipment as well as carry cuttings 101 up to the surface and deposit the cuttings on a shaker table 105. The level of mud in the pit may be detected using a pit volume sensor 220. The flow of mud entering the well bore may be detected using a well flow-in sensor 210. The flow of mud exiting the well may be detected using a well flow-out sensor 215. The depth of the drill bit may be detected using a bit depth sensor 225. The information gathered by these sensors and various combinations of this information may be used in order to provide a better understanding of the drill cutting characteristics and potential well conditions to an operator.

Figure 6:
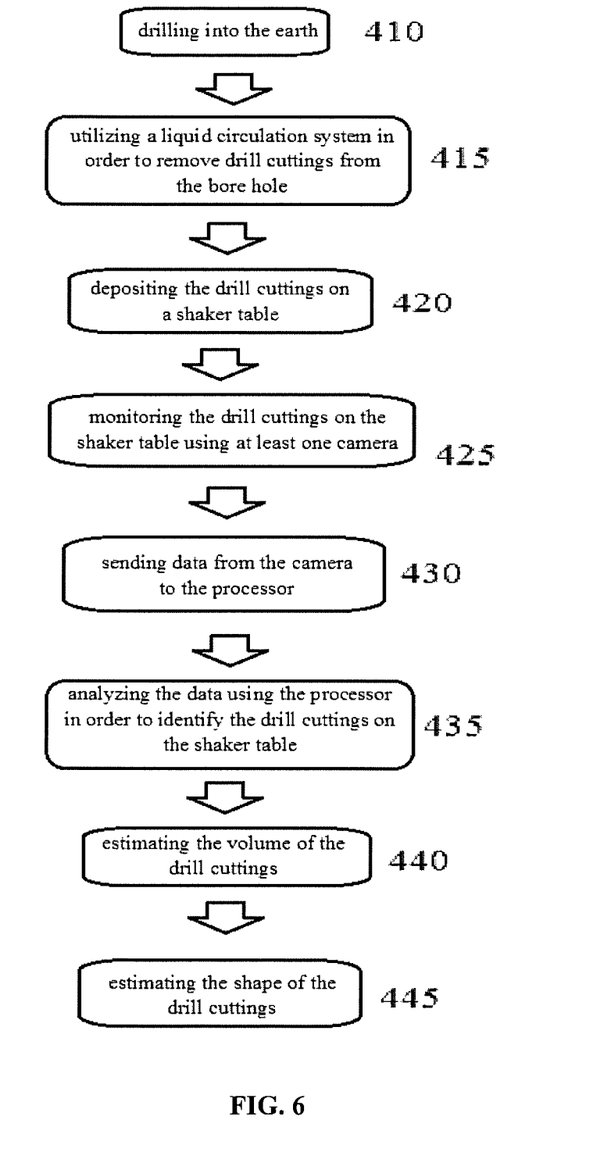
FIG. 6 depicts a potential method of analyzing drill cuttings.

FIG. 6 outlines a potential method of gathering drill cutting data and identifying drill cuttings 101, estimating the volume of the cuttings 101, and/or estimating the shape of the cuttings 101.

Disclosed embodiments relate to a system for monitoring volume of drilling cuttings, the system comprising a shaker table 105, wherein the shaker table 105 may be adjusted based on information compiled by a processor 115, at least one camera 110 configured to monitor said shaker table 105, wherein the camera 110 is operably connected to a processor 115 and wherein said processor 115 is configured to identify drill cuttings 101 and estimate the volume of the cuttings 101 using machine vision techniques, and a processor 115, wherein the processor 115 receives data from the at least one camera 110 and processes the data in order to identify drill cuttings 101 on the shaker table 105. Some embodiments may further comprise distance sensing equipment 130 operably connected to the processor 115, at least one sensor for detecting a predetermined parameter of a well circulatory system, and/or a well flow-in sensor 210, flow-out sensor 215, and pit volume sensor 220. The system may also comprise a light source 120 arranged and designed to illuminate the shaker table 105 during diverse weather conditions and times of day, at least two cameras 110 configured to provide stereo vision, and/or at least two cameras 110 configured to monitor the shaker table 105 from significantly different angles. In some disclosed embodiments, the speed and/or angle of the shaker table 105 may be automatically adjusted based on information received from the processor 115 without human input. Disclosed embodiments may also comprise a bit depth sensor 225 among other sensors.

Disclose embodiments may also relate to a system for monitoring volume of drilling cuttings 110 exiting a shaker table 105, the system comprising a shaker table screen 125, at least one camera 110 configured to monitor the shaker table screen 125, wherein the camera is operably connected to a processor 115 and wherein the processor 115 is configured to identify drill cuttings 101 and estimate the volume of the cuttings 101 on the screen 125 using machine vision techniques, and a processor 115, wherein the processor 115 receives data from the at least one camera 110 and processes the data in order to identify drill cuttings 101 on the shaker table 105.

Other embodiments may relate to a method of estimating the volume of drill cuttings 101 exiting a well, the method comprising the steps of: drilling into the earth 410, wherein the drilling creates a bore hole and drill cuttings 101, utilizing a liquid circulation system in order to remove drill cuttings from the bore hole 415, depositing the drill cuttings on a shaker table 420, monitoring the drill cuttings on the shaker table using at least one camera 425, wherein the camera is operably connected to a processor, sending data from the camera to the processor 430, and analyzing the data using the processor in order to identify the drill cuttings on the shaker table 435. Embodiments may further comprise the step of estimating the volume of the drill cuttings 440 and/or estimating the shape of the drill cuttings 445.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A system for monitoring a volume of drilling cuttings, the system comprising:
   a shaker table having an adjustable angle relative to level and an adjustable vibration speed;
   at least one processor; and
   at least one camera configured to monitor said shaker table, wherein the camera is operably connected to the processor and wherein the processor is configured to identify drill cuttings and estimate the volume of the cuttings, and wherein the angle or speed of the shaker table is automatically adjusted based on the estimated volume of the cuttings.

2. The system of claim 1, wherein the angle of the shaker table is automatically adjusted based on the estimated volume of the cuttings.

3. The system of claim 1, wherein the speed of the shaker table is automatically adjusted based on the estimated volume of the cuttings.

4. The system of claim 1, further comprising distance sensing equipment operably connected to the processor.

5. The system of claim 1, further comprising at least one sensor for detecting a predetermined parameter of a well circulatory system.

6. The system of claim 1, further comprising a well flow-in sensor, flow-out sensor, and pit volume sensor operably connected to the processor.

7. The system of claim 1, further comprising a light source arranged and designed to illuminate the shaker table during diverse weather conditions and times of day.

8. The system of claim 1, further comprising at least two cameras configured to provide stereo vision.

9. The system of claim 1, further comprising at least two cameras configured to monitor the shaker table from significantly different angles.

10. The system of claim 1, further comprising a bit-depth sensor operably connected to the processor.

11. The system of claim 1, wherein the angle and speed of the shaker table is automatically adjusted based on the estimated volume of the cuttings.

12. A system for monitoring a volume of drill cuttings exiting a shaker table, the system comprising:
   a shaker table having an adjustable angle relative to level and an adjustable vibration speed;
   a shaker table screen;
   a well circulation system, wherein the well circulation system deposits drill cuttings on the shaker table screen;
   processor;
   at least one camera configured to monitor the shaker table screen, wherein the camera is operably connected to the processor and wherein the processor is configured to identify drill cuttings and estimate the volume of the cuttings on the screen and wherein the angle or speed of the shaker table is automatically adjusted based on the estimated volume of the cuttings.

13. A method of estimating a volume of drill cuttings exiting a well, the method comprising the steps of:
- drilling into the earth, wherein the drilling creates a bore hole and drill cuttings, and wherein the cutting have both a volume and a shape;
- utilizing a liquid circulation system in order to remove drill cuttings from the bore hole;
- depositing the drill cuttings on a shaker table having an adjustable angle relative to level and an adjustable vibration speed;
- monitoring the drill cuttings on the shaker table using at least one camera, wherein the camera is operably connected to at least one processor;
- sending visual data from the camera to the processor;
- analyzing the data using the processor in order to identify the drill cuttings on the shaker table and estimating the volume of the cuttings on the screen; and
- adjusting automatically the angle or speed of the shaker table based on the estimated volume of the cuttings.

14. The method of claim 13, further comprising the step of estimating the shape of the drill cuttings.

15. The method of claim 13, wherein the liquid circulation system comprises a well flow-in sensor, flow-out sensor, and pit volume sensor operably connected to the processor.

\* \* \* \* \*